June 5, 1923.
C. H. DREHER
1,457,353
APPARATUS FOR SPACING ARTICLES
Filed July 25, 1922
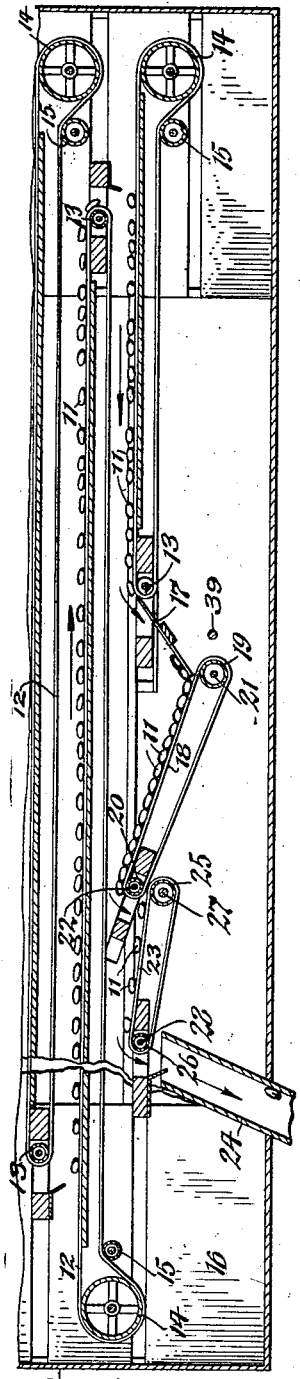

Patented June 5, 1923.

1,457,353

UNITED STATES PATENT OFFICE.

CHARLES H. DREHER, OF BUFFALO, NEW YORK.

APPARATUS FOR SPACING ARTICLES.

Application filed July 25, 1922. Serial No. 577,437.

*To all whom it may concern:*

Be it known that I, CHARLES H. DREHER, a citizen of the United States, residing at Buffalo, in the county of Erie and State of New York, have invented new and useful Improvements in Apparatus for Spacing Articles, of which the following is a specification.

This invention relates to an apparatus for spacing articles the proper distance apart so that they can be operated upon most effectively, and more particularly to an apparatus of this character which is designed to take a succession of loaves of dough in a promiscuous and variously spaced position relatively to each other from a proofing machine and spaces the same at regular and uniform distances apart before delivering these lumps of dough to a moulding and kneading machine preparatory to placing these loaves in a bake oven.

It is the object of this invention to provide an apparatus for spacing articles which is very simple in construction and capable of being applied as an adjunct to bakers' proofing or similar machines as commonly manufactured for the trade, and which will take the lumps of dough as they are discharged successively and at irregular distances apart from a proofing machine and accurately space the same apart without liability of any misses, so that they are presented properly to the machines which subsequently operate upon the loaves, thereby preventing the formation of what is known as "double" loaves at the point of discharge of the proofer, which otherwise would necessitate the employment of an extra man at some point between the discharge end of the proofer and the receiving end of the moulding and kneading machine, whose duty would be to separate such double loaves and return the same to the scale and rounder, preparatory to again going through the proofer.

In the accompanying drawings: Figure 1 is a fragmentary vertical longitudinal section of a baker's proofing machine, equipped with my improved article spacing apparatus. Figure 2 is a side elevation of the same. Figure 3 is a horizontal section taken on line 3—3, Fig. 2.

Similar characters of reference indicate corresponding parts in the views.

10 is the enclosing casing of the proofing machine in which is arranged a conveyer mechanism whereby the loaves or lumps of dough 11 are slowly moved back and forth through a long course, so that these loaves are thoroughly proofed between the time that they enter the top of this machine until they enter the outlet at the lower end thereof. The means for conveying the lumps of dough through this proofer may be variously constructed, but as shown in the drawings, the same comprises a plurality of belt conveyers 12 which are arranged one above the other within the enclosing casing and each mounted at its opposite ends around supporting pulleys or rollers 13, 14, and intermediate guide rollers, said rollers or pulleys being mounted on the main frame 16 within the enclosing casing and operated by any suitable and well known means. In the preferred construction shown in the drawings, these proofing belt conveyers are so arranged that the lumps of dough are carried forwardly by the upper stretch of each of the belts 12 and then discharged from the tail end thereof under the head end of the horizontal upper stretch of the next lower proofing belt conveyer, whereby the loaves are carried in longitudinal rows alternately in opposite directions within the enclosing casing. The rate of travel of these proofing belt conveyers may be varied, but it is usually about one hundred and twenty feet per minute. As the lumps of dough are discharged from the scale and rounder upon the uppermost belt conveyer of the proofer, they are arranged in different spaced relations to each other, some being spaced relatively far apart, which is not objectionable so far as the operation of other mechanism on these lumps of dough is concerned after the proofing operation while other lumps of dough are liable to overlap each other or be so closely arranged next to each other that they are liable to enter the kneader and moulder as one loaf and therefore necessitate separating these double loaves and doing the proofing work over again. To avoid this, the loaves or lumps of dough as they issue from the lowermost proofing belt conveyer of the proofing machine may be regarded as an instance of a means for supplying articles which are to be spaced proper distances apart, the supply of these articles being irregular or of promiscuous spacing so far as the relative position of the several articles on the supply belt or conveyer is concerned.

As the lumps of dough are discharged from the tail end of this lowermost proofing belt conveyer, the same are operated upon by the spacing apparatus which embodies my invention and which in its preferred form is constructed as follows:

17 represents a stationary guide which is inclined and in the form of a comparatively flat wide belt which has its upper receiving or head end arranged adjacent to the delivery or tail end of the lowermost article supplying conveyer, so that the loaves or lumps of dough as they issue from this conveyer will be delivered upon this incline and slide freely and quickly from the upper elevated end of this incline to the lower depressed end of the same.

Adjacent to the lower end of the incline 17 is arranged a gathering device which operates to gather the several lumps of dough in a longitudinal row and in such position that they are arranged either in actual contact with each other or close together, one behind the other. In its preferred form, this gathering device comprises an endless belt conveyer or apron 18, the upper or operative stretch of which is inclined and extends upwardly from its lower or head end to its elevated tail or discharge end. The head end of the operative stretch of the gathering conveyer is arranged immediately below the lower end of the inclined guide 17 and passes around a supporting pulley or roller 19, while the elevated delivery end or head of this conveyer passes around a pulley or roller 20, these rollers being mounted on shafts 21, 22, respectively which are journaled in suitable bearings on the main frame of the machine. The rate of travel of this gathering conveyer is comparatively slow, but preferably about twenty-eight feet per minute, which causes the loaves of dough which are directed from the faster traveling lowermost supply belt conveyer by the incline 17 to the gathering conveyer, to be deposited on the latter at such a rate that the succeeding loaves of dough form a longitudinal row on the same in which each loaf or each lump of dough either touches or is arranged close to the preceding lump of dough on the gathering conveyer. If lumps of dough are delivered to the incline 17 faster than they are discharged from the latter to the gathering conveyer, the excess number of lumps will form a longitudinal row on the upper side of the incline, as shown in Figs. 1 and 3, and thus form a reserve supply which will maintain a continuity of feeding of lumps of dough to the gathering apron in the event that too great a space occurs between some of the lumps of dough on the supply conveyer, thereby operating as a regulator which takes the loaves coming from the supply conveyer in an irregularly spaced order and redepositing the same on the gathering apron in a regular order.

As each lump of dough reaches the tail end of the operative stretch of the gathering conveyer, it is discharged therefrom upon a more rapidly moving spreading conveyer which causes the lumps of dough to be again spaced considerable distances apart but with uniform spacing between the several lumps of dough. In its preferred form, this spreading conveyer comprises an endless belt or apron 23, the upper operative stretch of which is preferably inclined slightly and arranged with its lower head or receiving end below the tail end of the gathering conveyer, while its elevated discharge end is arranged over a chute or spout 24, whereby the lumps of dough after being properly spaced apart when discharged from the spreading conveyer, are directed to the kneading and moulding apparatus which subsequently operates upon the dough, preparatory to introducting the same into the oven for baking into finished loaves. The head and tail portions of the spreading conveyer pass around rolls or pulleys 25, 26, which are mounted on transverse shafts 27, 28, journaled in suitable bearings on the main frame. This spreading conveyer is operated so that it moves at a rate of speed somewhat faster than the speed of the article supplying conveyer and considerably faster than the rate of speed of the gathering conveyer, for example, at the rate of about one hundred and eighty feet per minute. It follows from this construction, that as each lump of dough falls from the tail of the gathering conveyer onto the spreading conveyer, the same will be moved forward very rapidly and produce a gap or even spacing between this lump of dough and the next following lump of dough deposited upon this spreading conveyer by the slowly moving gathering conveyer. Inasmuch as the lumps of dough are arranged end to end in a longitudinal row and in a definite close relation to each other on the gathering conveyer, the same will be delivered in regular order to the spreading conveyer, which latter however will space them apart a considerable distance, which distance is determined by the capacity or method of operation of the machine which subsequently operates individually upon these articles, which in the present instance is the kneading and moulding machine, which may be of any suitable and well known type.

The relative speed of the article supply conveyer, the gathering conveyer and spreading conveyer and the inclination of the regulating guide may be varied to suit different installations, and the speed or capacity of other machines with which this present apparatus co-operates, and the rates of speed above given are therefore merely an instance of one suitable for a certain installation which has been found satisfactory in practice.

Although the driving mechanism for imparting motion to the several conveyers, as above described may be varied, that shown in the drawings has been found satisfactory in practice, and as there shown the same is constructed as follows:

29 represents a horizontal driving shaft arranged lengthwise on one side of the casing and journaled in suitable bearings. Motion may be transmitted to this driving shaft by any approved form, for instance, such as an electric motor 30 mounted adjacent thereto and geared therewith by means of suitable gearing 31. Motion is transmitted from this driving shaft to the intermediate roller or pulley 15 of the lowermost article supply conveyer by means of a bevel gear pinion 32 arranged on the driving shaft and meshing with a bevel gear wheel 33 secured to one end of the shaft of the intermediate roller 15. The opposite end of this shaft is provided with a spur gear pinion 34 which meshes with a spur gear wheel 35 secured to the adjacent end of the shaft which carries the adjacent end supporting roller or pulley 14 of the lowermost supply conveyer.

36 represents a countershaft journaled transversely in a suitable bearing on the main frame and provided with a bevel gear wheel 37 meshing with a bevel gear pinion 38 on the adjacent part of the driving shaft 29.

39 represents an intermediate shaft journaled horizontally and transversely in suitable bearings on the main frame and provided with an outer sprocket gear wheel 40 and an inner sprocket pinion 41. A chain belt 42 passes around the sprocket pinion 41 and a smaller sprocket pinion 52 on the countershaft 36, and a chain belt 43 passes around the sprocket wheel 40 and a sprocket pinion 44 which is secured to one end of the shaft which carries the roller 25 upon which is mounted the head or receiving end of the gathering conveyer. Motion is transmitted from the intermediate shaft 39 to the gathering conveyer by means of a spur gear pinion 45 secured to the intermediate shaft on the outer side of the casing and meshing with a spur gear wheel 46 on the adjacent end of the shaft 21 which carries the head or receiving pulley 19 of the gathering conveyer.

By means of this driving mechanism, the several speeds above described with reference to these conveyers will be imparted thereto and cause the several lumps of dough arranged in a longitudinal row but in an irregular spaced relation relatively to each other to be delivered to the inclined regulating guide, which latter delivers them upon the slowly moving gathering conveyer and causes these lumps of dough to be arranged in a longitudinal row thereon but in such justapostion that these lumps will not overlap but have an end to end contact, thus insuring the delivery of these lumps one at a time at definite intervals to the spreading conveyer, which latter in turn separates these lumps with equally definite spaces between the same to insure individual operation upon these loaves by the machine which subsequently receives the same.

I claim as my invention:

1. An apparatus of the character described, comprising a stationary incline which receives articles to be spaced irregularly from a source of supply, a gathering conveyer which receives the articles from said incline, and a spreading conveyer which receives said articles from said gathering conveyer, said spreading conveyer having a faster propelling effect than said gathering conveyer.

2. An apparatus of the character described, comprising a supply conveyer which supplies articles to be spaced a stationary incline which receives the articles to be spaced from said supply conveyer, a gathering conveyer which receives said articles from said incline, and a spreading conveyer which receives said articles from said gathering conveyer and delivers the same in spaced relation to one another, said gathering conveyer having a propelling effect which is slower than said supply conveyer, and said spreading conveyer having a propelling effect which is faster than said gathering conveyer.

3. An apparatus of the character described, comprising a supplying belt conveyer which supplies in a promiscuously spaced condition, articles which are to be regularly spaced, a stationary incline which extends downwardly from the tail end of said supplying conveyer and receives said articles from the latter, a gathering belt conveyer having an upper inclined operative stretch the head of which is depressed and arranged to receive said articles from the lower end of said incline, and a spreading belt conveyer having an upper operative stretch the head end of which receives said articles from the tail of said gathering belt conveyer and the tail of which is adapted to deliver the articles to the place intended to receive the same, said gathering conveyer being driven at a rate slower than said supplying conveyer and spreading conveyer.

4. An apparatus of the character described, comprising a supplying belt conveyer which supplies in a promiscuously spaced condition articles which are to be regularly spaced, a stationary incline which extends downwardly from the tail end of said supplying conveyer and receives said articles from the latter, a gathering belt conveyer having an upper inclined operative stretch the head of which is depressed and arranged to receive said articles from the lower end of said incline, a spreading belt conveyer having an upper operative stretch the head end of which receives said articles from the tail of said gathering belt conveyer and the tail of which is adapted to deliver the articles to the place intended to receive the same, and means for driving said gathering conveyer slower than the supplying conveyer and also driving said spreading conveyer faster than said gathering and supplying conveyers.

5. An apparatus of the character described, comprising a supplying belt conveyer which supplies in a promiscuously spaced condition articles which are to be regularly spaced, a stationary incline which extends downwardly from the tail end of said supplying conveyer and receives said articles from the latter, a gathering belt conveyer having an upper inclined operative stretch the head of which is depressed and arranged to receive said articles from the lower end of said incline, a spreading belt conveyer having an upper operative stretch the head end of which receives said articles from the tail of said gathering belt conveyer and the tail of which is adapted to deliver the articles to the place intended to receive the same, and means for driving said gathering conveyer slower than the supplying conveyer and also driving said spreading conveyer faster than said gathering and supplying conveyers, comprising a driving shaft, bevel gearing connecting said driving shaft with said supplying conveyer, a countershaft, bevel gearing connecting said driving shaft and countershaft, belt gearing connecting said countershaft with said spreading conveyer, and spur gearing connecting said belt gearing with said gathering conveyer.

CHARLES H. DREHER.